United States Patent
Fulton

(10) Patent No.: US 10,528,363 B2
(45) Date of Patent: *Jan. 7, 2020

(54) CONSERVATIVE CLASS PRELOADING FOR REAL TIME JAVA EXECUTION

(71) Applicant: International Business Machines Corporation, Armonk, NY (US)

(72) Inventor: Michael S. Fulton, Squamish (CA)

(73) Assignee: INTERNATIONAL BUSINESS MACHINES CORPORATION, Armonk, NY (US)

(*) Notice: Subject to any disclaimer, the term of this patent is extended or adjusted under 35 U.S.C. 154(b) by 321 days.

This patent is subject to a terminal disclaimer.

(21) Appl. No.: 15/274,368

(22) Filed: Sep. 23, 2016

(65) Prior Publication Data
US 2017/0010906 A1     Jan. 12, 2017

Related U.S. Application Data

(63) Continuation of application No. 11/465,399, filed on Aug. 17, 2006, now Pat. No. 9,477,495.

(51) Int. Cl.
    *G06F 9/44*            (2018.01)
    *G06F 9/445*          (2018.01)
    *G06F 8/30*            (2018.01)

(52) U.S. Cl.
CPC .......... *G06F 9/44521* (2013.01); *G06F 8/315* (2013.01)

(58) Field of Classification Search
CPC .................................................. G06F 8/00–65

(Continued)

(56) References Cited

U.S. PATENT DOCUMENTS 6,102,966 A * 8/2000 Tyma .................... G06F 9/4492
                                                                                               717/110
6,272,674 B1    8/2001   Holiday, Jr.
(Continued)

FOREIGN PATENT DOCUMENTS

WO      2003027841 A2     4/2003

OTHER PUBLICATIONS

Perrone, "J2EE Session EJB Development," [online], informIT.com, [retrieved Mar. 16, 2012] retrieved from the Internet: <http://www.informit.com/articles/printerfriendly.aspx?p=21630>, 6 pg.
(Continued)

*Primary Examiner* — Jue Louie
(74) *Attorney, Agent, or Firm* — Cuenot, Forsythe & Kim, LLC

(57) ABSTRACT

A computer implemented method, a computer program product and a data processing system for executing an application written in a dynamic language are provided. An execution point of the application is loaded. A list of classes associated with the execution point is generated. The loading of each class in the list of classes is simulated. New execution points and new classes accessible from each execution point within each class in the list of classes are identified by recursively parsing instructions associated with each execution point. The list is modified to include the identified new execution points and new classes. Responsive to a determination that new execution points and new classes have been identified, the steps of identifying new execution points and new classes and modifying the list is repeated. The list is saved.

18 Claims, 3 Drawing Sheets

(58) Field of Classification Search
USPC .................................................. 717/100–178
See application file for complete search history.

(56) References Cited

U.S. PATENT DOCUMENTS

| | | | |
|---|---|---|---|
| 6,442,753 B1 | 8/2002 | Gerard et al. | |
| 6,463,581 B1 | 10/2002 | Bacon | |
| 6,526,571 B1 * | 2/2003 | Aizikowitz | G06F 9/4491 717/154 |
| 6,571,388 B1 | 5/2003 | Venkatraman et al. | |
| 6,725,280 B1 | 4/2004 | Bracha | |
| 6,907,579 B2 | 6/2005 | Chang | |
| 6,948,156 B2 * | 9/2005 | Sokolov | G06F 9/4492 717/136 |
| 6,983,460 B1 | 1/2006 | Goire et al. | |
| 6,993,774 B1 | 1/2006 | Glass | |
| 7,065,760 B2 | 6/2006 | Dmitriev | |
| 7,171,672 B2 | 1/2007 | Just | |
| 7,243,346 B1 | 7/2007 | Seth et al. | |
| 2002/0095659 A1 | 7/2002 | Jacobs et al. | |
| 2002/0107996 A1 | 8/2002 | Bracha et al. | |
| 2005/0188343 A1 * | 8/2005 | Houldsworth | G06F 9/445 717/100 |
| 2005/0257007 A1 | 11/2005 | Moore et al. | |
| 2006/0059471 A1 | 3/2006 | Prokopenko | |
| 2008/0127141 A1 | 5/2008 | Fulton | |

OTHER PUBLICATIONS

"TestProxyAPI," [online] Jun. 19, 2001, retrieved from the Internet: <http://web.archive.org/web/20020619123814/http://www.extreme-java.de/junitx/api/junits/framework/TestProxy.html>, 1 pg.

"XPTools: Step 8g: Implement, JUnitX Enhancements," [online] [retrieved Mar. 15, 2012] retrieved from the Internet: <http://web.archive.org/web/20020701232751/http://www.extreme-java.de/xptools/tutorial2 . . . >, 3 pg.

Rayside et al., "Extracting Java Library Subsets for Deployment on Embedded Systems," Science of Computer Programming, vol. 45, pp. 245-270, 2002.

Engel, J. "Programming for the Java Virtual Machine," [online] Addison-Wesley Professional, Jun. 22, 1999, pp. 193-196, retrieved from the Internet: <http://academic.safaribooksonline.com/print?xmlid=0-201-30972-6/ch10 . . . >, 5 pg.

Takase et al., "Efficient Web Services response Caching by Selecting Optimal Data Representation," In Proc. of 24th Int'l. Conf. on Distributed Computing Systems, 2004, IEEE, pp. 1188-1197.

Kozen et al., "Eager Class Initialization for Java," In Int'l. Sym. on Formal Techniques in Real-Time and Fault-Tolerant Systems, pp. 71-80, Springer Berlin Heidelberg, Sep. 2002.

U.S. Appl. No. 11/465,399, Non-Final Office Action, dated May 12, 2011, 10 pg.

U.S. Appl. No. 11/465,399, Final Office Action, dated Aug. 31, 2011, 12 pg.

U.S. Appl. No. 11/465,399, Non-Final Office Action, dated Mar. 29, 2012, 15 pg.

U.S. Appl. No. 11/465,399, Final Office Action, dated Oct. 15, 2012, 16 pg.

U.S. Appl. No. 11/465,399, Final Office Action, dated May 24, 2013, 24 pg.

U.S. Appl. No. 11/465,399, Examiner's Answer to Appeal Brief, dated Dec. 5, 2013, 30 pg.

U.S. Appl. No. 11/465,399, Decision on Appeal, dated Feb. 24, 2016, 13 pg.

U.S. Appl. No. 11/465,399, Notice of Allowance, dated Jul. 5, 2016, 12 pg.

* cited by examiner

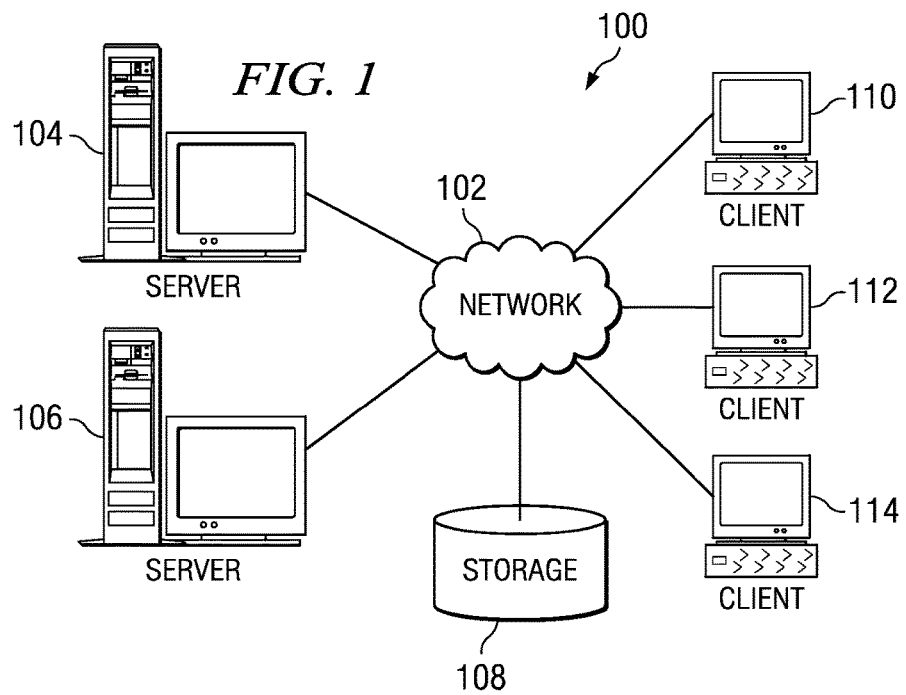

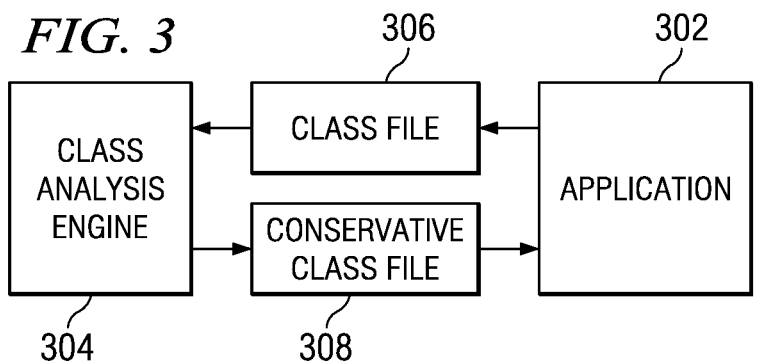
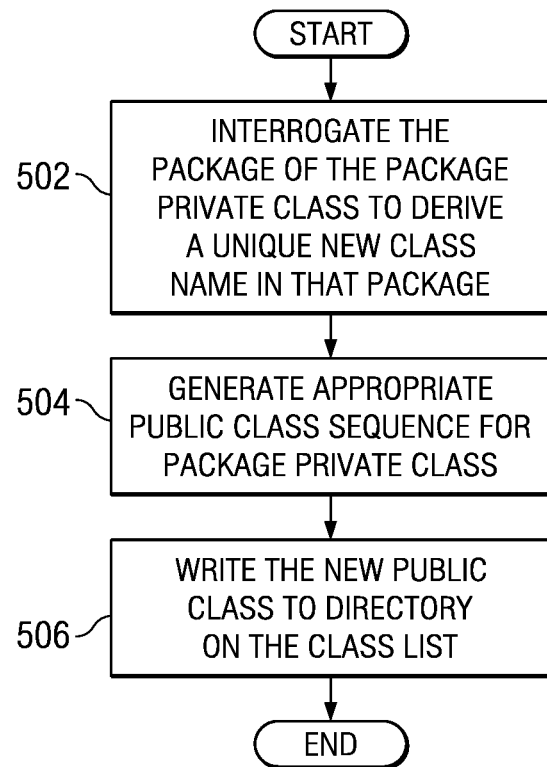

CONSERVATIVE CLASS PRELOADING FOR REAL TIME JAVA EXECUTION

BACKGROUND OF THE INVENTION

1. Field of the Invention

The present invention relates generally to a data processing system. More specifically, the present invention relates to a computer implemented method, computer program product and data processing system for executing an application written in a dynamic language.

2. Description of the Related Art

The Internet is a global network of connected computer networks. Over the last several years, the Internet has grown in significant measure. A large number of computers on the Internet provide information in various forms. Anyone with a computer connected to the Internet can potentially tap into this vast pool of information.

The most wide spread method of providing information over the Internet is via the World Wide Web (the Web). The Web consists of a subset of the computers connected to the Internet; the computers in this subset run Hypertext Transfer Protocol (HTTP) servers (Web servers). The information available via the Internet also encompasses information available via other types of information servers such as GOPHER, WAIS, SMTP (simple mail transfer protocol), POPS (Post Office Protocol) and FTP (file transfer protocol).

Information on the Internet can be accessed through the use of a Uniform Resource Locator (URL). A Uniform Resource Locator (URL) uniquely specifies the location of a particular piece of information on the Internet.

Web servers host information in the form of Web pages; collectively the server and the information hosted are referred to as a Web site. A significant number of Web pages are encoded using the Hypertext Markup Language (HTML) although other encodings using the eXtensible Markup Language (XML) or the Standard Generic Markup Language (SGML) are becoming increasingly more common. The published specifications for these languages are incorporated by reference herein. Web pages written in these formatting languages may include links to other Web pages on the same Web site or another Web site. As will be known to those skilled in the art, Web pages may be generated dynamically by a server by integrating a variety of elements into a formatted page prior to transmission to a Web client. Web servers, and information servers of other types, await requests for the information from Internet clients.

Client software has evolved that allows users of computers connected to the Internet to access this information. Advanced clients such as Microsoft's Internet Explorer allow users to access software provided via a variety of information servers in a unified client environment (Microsoft is a trademark of Microsoft Corporation in the United States, other countries, or both). Typically, such client software is referred to as browser software.

Client machines connected to the Internet run Web browsers which generally operate by establishing a TCP/IP connection with a server Web site and downloading files written in hyper-text mark-up language (HTML) from the Web site. Java™ enabled browsers running on conventional type personal computers include a Java Virtual Machine (JVM) in which Java byte-code is executed within the browser (Java and all Java-based trademarks are trademarks of Sun Microsystems, Inc. in the United States, other countries, or both).

Java is an object-oriented programming language and environment focusing on defining data as objects and the methods that may be applied to those objects. Java is designed to solve a number of problems in modern programming practice. Java is able to support applications for many types of data processing systems, which may contain a variety of central processing units and operating system architectures. To enable a Java application to execute on different types of data processing systems, a compiler typically generates an architecture-neutral file format, so that the compiled code is executable on many processors, given the presence of the Java runtime system. The Java compiler generates byte code instructions that are non-specific to any particular computer architecture. A byte code is a machine independent code generated by the Java compiler and executed by a Java interpreter. A Java interpreter is a module that alternately decodes and executes a byte code. The decoding of the byte code places the instruction into an executable form for the computer on which the code is to be executed. Then, the instruction is executed by the computer. These byte code instructions are designed to be easy to interpret on any machine and easily translated on the fly into native machine code.

The Java Virtual Machine (JVM) is a virtual computer component. A virtual computer component is an abstract computer component that only resides in memory. A JVM includes components necessary to run a program on a computer, including an interpreter. The JVM allows Java programs to be executed on different platforms as opposed to only a single platform. Typically, computer programs are originally written in a human-readable format called source code, which is then compiled (by a computer program called a "compiler") into a format that can be directly implemented by a computer system. Conventionally, programs must be compiled for one specific platform (i.e. processing unit and operating system combination), such that a program that has been compiled for one platform will often not run on a different platform. Java programs are compiled for the JVM, rather than for any particular platform (although there are typically different versions of the JVM adapted to different platforms). In this manner, Java is able to support applications for many types of data processing systems, which may contain a variety of central processing units and operating system architectures.

There are a number of approaches to dynamically loading interdependent components of executable code (such as plug-ins, bundles, etc.) in modern programming languages. Dynamically loading means to load one or more components of an application after the application has begun execution. In the Java programming language, classes are dynamically loaded using a class loader as an application program executes. The class loader is responsible for searching for a particular class, and making that class available to the run-time system if found. In object-oriented programming, a class consists of a collection of types of encapsulated instance variables and types of methods, possibly with implementation of those types, together with a constructor function that can be used to create objects of the class. Java class loading is based on a delegation model, wherein a class loader first delegates the class loading responsibility to its immediate parent class loader.

There are a number of limitations inherent in this prior art class loading approach, however. Because the delegation model is linked to Java's single inheritance class structure, a class loader parent chain must be able to load a complete Java type graph. A single inheritance is the ability for a class, the derived class, to inherit from exactly one class, its base class. This necessarily limits subsystems to only one prerequisite, and that prerequisite (and its ancestry) must be able to supply all of the subsystem's ancestor classes, a complex composition of prerequisite components cannot be supported under this approach. In other words, the Java programmer needs to make sure that all type relationships implied in the class implementation, including extended classes, implemented interfaces, declared data member types, argument types of methods, return types of methods, and so forth, can be loaded by the single loader chain of the class. When dealing with complex functional relationships, the programmer typically addresses this problem by adding all the required archives, or "jar" files, on a single long class path. This is a less-than-optimal solution.

Furthermore, components, such as plug-ins, that require a considerable amount of resources, such as storage, to be allocated, take time to be initialized, and will often trigger the loading of many classes once initialized, which consumes more resources and takes additional time. This approach results in an inefficient use of resources in many cases, and increases the start-up time and the memory footprint of the program in which the plug-in is contained. For example, it may happen that some classes are not actually accessed until a relatively long time after activating the plug-in whose initialization triggered loading of the class, and some may never be accessed. These inefficiencies become especially significant in resource-constrained systems.

Other approaches to dynamic class loading, such as OSGi ("Open Services Gateway Initiative") bundles, use an independent class loader for each component, rather than using the delegation model. However, OSGi bundles do not address the limitations of dynamic class loaders which have been discussed. OSGi bundles continue to rely on parent relationships during loading, and initialize upon start-up as well. The term "OSGi bundles" refers to components which adhere to the OSGi Service Gateway Specification. OSGi bundles are archive files containing class files and resources. A manifest file of a bundle identifies the contents of the bundle and also the packages and services which are imported and exported by that bundle. More information on this specification may be found on the Internet at the OSGi Web site, www.osgi.org. The preceding reference to the OSGi Web site is provided for convenience only and does not in any manner serve as an endorsement by IBM of that Web site. Any use of that Web site may be subject to license conditions and is at your own risk.

Real-time applications cannot tolerate the possibly large delays, on the order of tens (10's) of milliseconds, that can occur if a code segment, for example a Java class, is lazily loaded. Lazily loaded means to delay loading one or more components of an application until the application requires it for execution. Today, there are several options available that are less-than-optimal. One solution is for the user to manage a list of classes themselves and manually load them. Many users do this, but this approach is susceptible to user error. Another approach is for the user to write a simple routine to pre-load all classes in a jar file. This solution loads far more than is necessary. If users want to compile methods of a class at load time, this approach contains too much data and takes a significant amount of time and also uses a significant amount of memory to hold classes that will likely not be referenced. There is also the possibility, as with the first option, that the list of jar files is incomplete. A third solution is to perform a whole program analysis and require that classes can not be dynamically loaded. This solution requires that the program code be a subset of the Java language and this can not be enforced at runtime without restricting the language.

Accordingly, what is needed is an improved technique for dynamically loading independent components referenced code written in a dynamic language at the start of execution instead of lazily, for more deterministic execution time of real-time applications. Independent components are those components whose classes are not necessarily located within a single functional dependence hierarchy.

BRIEF SUMMARY OF THE INVENTION

Exemplary embodiments describe a computer implemented method, a computer program product and a data processing system for executing an application written in a dynamic language. An execution point of the application is loaded. A list of classes associated with the execution point is generated. New execution points and new classes accessible from each execution point within each class in the list of classes are identified by recursively parsing instructions associated with each execution point. The list is modified to include the identified new execution points and new classes. Responsive to a determination that new execution points and new classes have been identified, the steps of identifying new execution points and new classes and modifying the list is repeated. The list is saved.

Another exemplary embodiment provides that in response to a determination that no new execution points and new classes have been identified, each class in the list of classes is loaded.

Another exemplary embodiment provides that the list includes at least one package private class being within a package.

Another exemplary embodiment provides that modifying the list to include the identified package private class further comprises extending the package private class to create a new public class within the package.

Another exemplary embodiment provides that the new public class has a unique name referring to the package private class and that the new public class has a public constructor that accepts no parameters.

Another exemplary embodiment provides that in response to a determination that instructions associated with each execution point cannot be recursively parsed, a proxy that defines what classes and execution points are accessible through the execution point is provided.

Exemplary embodiments describe a computer implemented method, a computer program product and a data processing system for facilitating loading of a package private class for integration into code to be executed by a computer system, the package private class being within a package. The package private class is extended to create a new public class within the package, wherein the new public class has a unique name referring to the package private class and wherein the new public class has a public constructor that accepts no parameters. The new public class is saved in machine-readable storage.

BRIEF DESCRIPTION OF THE SEVERAL VIEWS OF THE DRAWINGS

The novel features believed characteristic of the invention are set forth in the appended claims. The invention itself, however, as well as a preferred mode of use, further objectives and advantages thereof, will best be understood by reference to the following detailed description of an illustrative embodiment when read in conjunction with the accompanying drawings, wherein:

FIG. 1 is a pictorial representation of a network of data processing systems in which exemplary aspects may be implemented;

FIG. 2 is a block diagram of a data processing system in which exemplary aspects may be implemented;

FIG. 3 is a block diagram of components for executing an application written in a dynamic language in accordance with an exemplary embodiment;

FIG. 5 is a flowchart illustrating the operation of preloading and verifying package private classes in accordance with an exemplary embodiment.

DETAILED DESCRIPTION OF THE INVENTION

Figure 4:
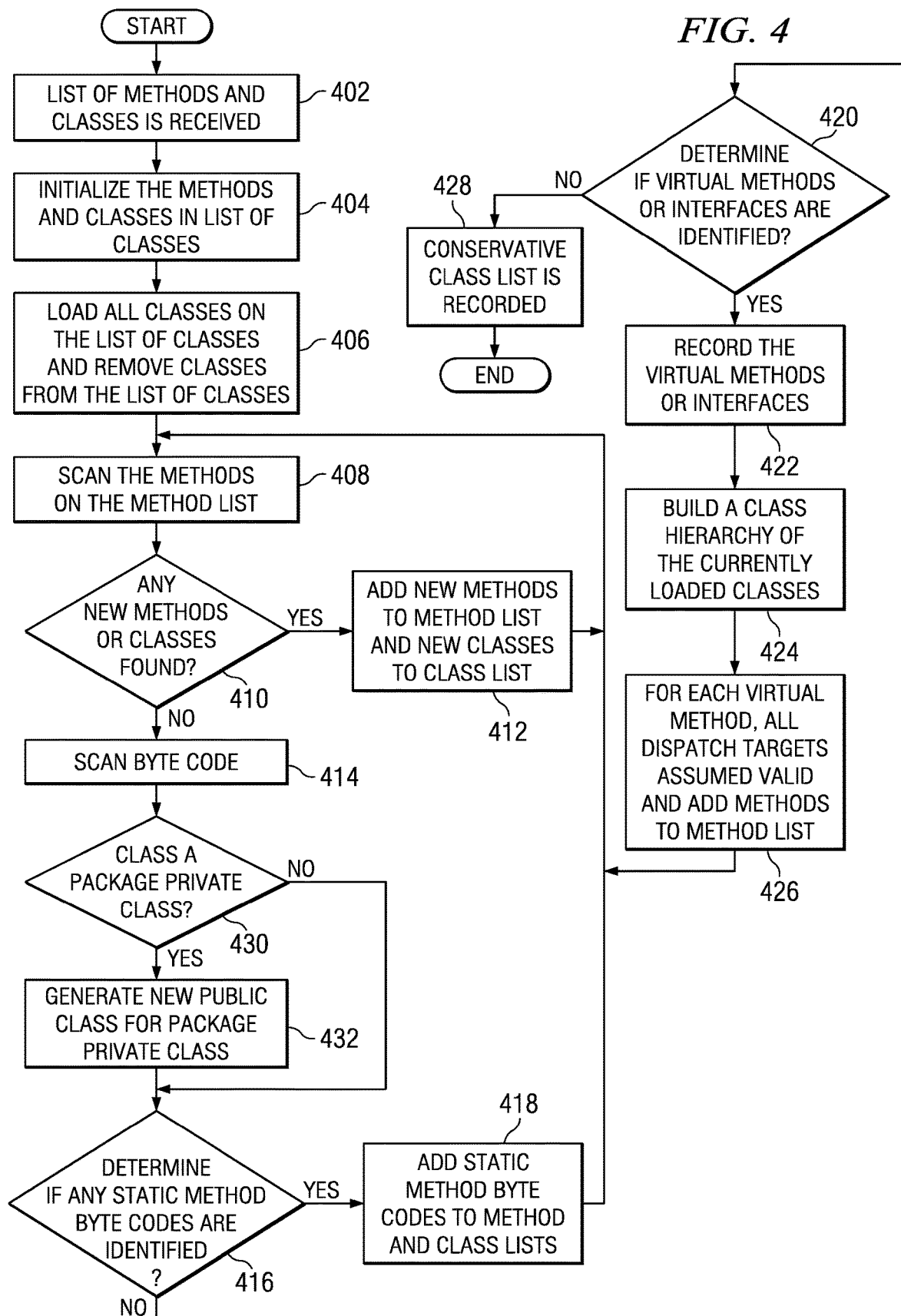
FIG. 4 is a flowchart illustrating the operation of executing an application written in a dynamic language in accordance with an exemplary embodiment.

FIGS. 1-2 are provided as exemplary diagrams of data processing environments in which embodiments may be implemented. It should be appreciated that FIGS. 1-2 are only exemplary and are not intended to assert or imply any limitation with regard to the environments in which aspects or embodiments may be implemented. Many modifications to the depicted environments may be made without departing from the spirit and scope of the present invention.

With reference now to the figures, FIG. 1 depicts a pictorial representation of a network of data processing systems in which aspects of the present invention may be implemented. Network data processing system 100 is a network of computers in which exemplary embodiments may be implemented. Network data processing system 100 contains network 102, which is the medium used to provide communications links between various devices and computers connected together within network data processing system 100. Network 102 may include connections, such as wire, wireless communication links, or fiber optic cables.

In the depicted example, server 104 and server 106 connect to network 102 along with storage unit 108. In addition, clients 110, 112, and 114 connect to network 102. These clients 110, 112, and 114 may be, for example, personal computers or network computers. In the depicted example, server 104 provides data, such as boot files, operating system images, and applications to clients 110, 112, and 114. Clients 110, 112, and 114 are clients to server 104 in this example. Network data processing system 100 may include additional servers, clients, and other devices not shown.

In the depicted example, network data processing system 100 is the Internet with network 102 representing a worldwide collection of networks and gateways that use the Transmission Control Protocol/Internet Protocol (TCP/IP) suite of protocols to communicate with one another. At the heart of the Internet is a backbone of high-speed data communication lines between major nodes or host computers, consisting of thousands of commercial, government, educational and other computer systems that route data and messages. Of course, network data processing system 100 also may be implemented as a number of different types of networks, such as for example, an intranet, a local area network (LAN), or a wide area network (WAN). FIG. 1 is intended as an example, and not as an architectural limitation for different embodiments.

With reference now to FIG. 2, a block diagram of a data processing system is shown in which aspects of the present invention may be implemented. Data processing system 200 is an example of a computer, such as server 104 or client 110 in FIG. 1, in which computer usable code or instructions implementing the processes for embodiments may be located.

In the depicted example, data processing system 200 employs a hub architecture including north bridge and memory controller hub (NB/MCH) 202 and south bridge and input/output (I/O) controller hub (ICH) 204. Processing unit 206, main memory 208, and graphics processor 210 are connected to north bridge and memory controller hub 202. Graphics processor 210 may be connected to north bridge and memory controller hub 202 through an accelerated graphics port (AGP).

In the depicted example, local area network (LAN) adapter 212 connects to south bridge and I/O controller hub 204. Audio adapter 216, keyboard and mouse adapter 220, modem 222, read only memory (ROM) 224, hard disk drive (HDD) 226, CD-ROM drive 230, universal serial bus (USB) ports and other communications ports 232, and PCI/PCIe devices 234 connect to south bridge and I/O controller hub 204 through bus 238 and bus 240. PCI/PCIe devices may include, for example, Ethernet adapters, add-in cards and PC cards for notebook computers. PCI uses a card bus controller, while PCIe does not. ROM 224 may be, for example, a flash binary input/output system (BIOS).

Hard disk drive 226 and CD-ROM drive 230 connect to south bridge and I/O controller hub 204 through bus 240. Hard disk drive 226 and CD-ROM drive 230 may use, for example, an integrated drive electronics (IDE) or serial advanced technology attachment (SATA) interface. Super I/O (SIO) device 236 may be connected to south bridge and I/O controller hub 204.

An operating system runs on processing unit 206 and coordinates and provides control of various components within data processing system 200 in FIG. 2. As a client, the operating system may be a commercially available operating system such as Microsoft® Windows® XP (Microsoft and Windows are trademarks of Microsoft Corporation in the United States, other countries, or both). An object-oriented programming system, such as the Java programming system, may run in conjunction with the operating system and provide calls to the operating system from Java programs or applications executing on data processing system 200.

As a server, data processing system 200 may be, for example, an IBM eServer™ pSeries® computer system, running the Advanced Interactive Executive (AIX®) operating system or LINUX operating system (eServer, pSeries and AIX are trademarks of International Business Machines Corporation in the United States, other countries, or both while Linux is a trademark of Linus Torvalds in the United States, other countries, or both). Data processing system 200 may be a symmetric multiprocessor (SMP) system including a plurality of processors in processing unit 206. Alternatively, a single processor system may be employed.

Instructions for the operating system, the object-oriented programming system, and applications or programs are located on storage devices, such as hard disk drive 226, and may be loaded into main memory 208 for execution by processing unit 206. The processes for embodiments are performed by processing unit 206 using computer usable program code, which may be located in a memory such as, for example, main memory 208, read only memory 224, or in one or more peripheral devices 226 and 230.

Those of ordinary skill in the art will appreciate that the hardware in FIGS. 1-2 may vary depending on the implementation. Other internal hardware or peripheral devices, such as flash memory, equivalent non-volatile memory, or optical disk drives and the like, may be used in addition to or in place of the hardware depicted in FIGS. 1-2. Also, the processes may be applied to a multiprocessor data processing system.

In some illustrative examples, data processing system 200 may be a personal digital assistant (PDA), which is configured with flash memory to provide non-volatile memory for storing operating system files and/or user-generated data.

A bus system may be comprised of one or more buses, such as bus 238 or bus 240 as shown in FIG. 2. Of course the bus system may be implemented using any type of communications fabric or architecture that provides for a transfer of data between different components or devices attached to the fabric or architecture. A communications unit may include one or more devices used to transmit and receive data, such as modem 222 or network adapter 212 of FIG. 2. A memory may be, for example, main memory 208, read only memory 224, or a cache such as found in north bridge and memory controller hub 202 in FIG. 2. The depicted examples in FIGS. 1-2 and above-described examples are not meant to imply architectural limitations. For example, data processing system 200 also may be a tablet computer, laptop computer, or telephone device in addition to taking the form of a PDA.

In an exemplary embodiment, an application written in a dynamic language is scanned, starting at an execution point of the application. A dynamic language is a computer language that provides mechanisms to load new program components for use by the application during execution of the application. An execution point is a location in an application. An application is a computer program that performs a well defined action or set of actions. A method is an execution point in an application that has a name and may be called directly, or indirectly, in the application encoding.

The scanning reveals other execution points and applications that may be reached by the application. The scanning is repeated until a list of all reachable applications and execution points is obtained. Reachable means that either a direct or indirect reference is made between two applications or executions points. For example, a first method is reachable from a second method if there is either a direct or indirect reference from the first method to the second method. Since the application is written in a dynamic language, one difficulty is efficiently determining what virtual method may be reached, which requires a conservative approach to tracking the virtual dispatch target. A virtual method is a method that overrides the general method definition for an object. For example, the drive( ) method of a Porsche object is the virtual method of the more general drive( ) method of a Car object. A conservative approach is an approach that will provide a result list that is correct, but possibly not the smallest result list. A virtual dispatch target is the actual method that is executed on a virtual method call.

Once a list of reachable methods is determined, the list can be used in either a static approach or a dynamic approach. The static approach is to generate source code that the user builds into their application as part of the deployment step. The dynamic approach is to generate the list at startup of the application and then aggressively pre-load, and optionally compile, the code. For applications that cannot afford the time to do the analysis at runtime, using the static approach to generate the method at deployment would usually be the best option. Whereas, for applications that run a long time and can afford the time to calculate the result at runtime, the dynamic approach makes more sense, as the application can just directly make the call.

An advantage of exemplary embodiments over previous solutions is that the exemplary embodiments can be run as part of the deployment or runtime process and therefore, are less prone to error. Also, exemplary embodiments do not require as many classes to be loaded as the simple solution, that just loads all classes in all jar files, requires. Furthermore, implementations of exemplary embodiments can be fully conformant to the Java specification.

Exemplary embodiments provide other advantages as well. The compilation of the method can be delayed until runtime, enabling a just-in-time (JIT) compiler to potentially generate better code than Java conformant ahead-of-time compilers. A just-in-time (JIT) compiler is a compiler that translates a high-level language representation of a method or methods to machine instructions during execution of the application itself. An ahead-of-time compiler is a compiler that translates a high-level language representation of a method or methods to machine instructions before execution of the application itself.

Also, the generated code can be analyzed more completely to determine if class initialization can also be run on classes when they are loaded. Normally, this type of analysis cannot be performed because running class initializers in the wrong order could cause the program to fail or run incorrectly. A class initializer is a method that, when executed, initializes the data associated with a class to a well defined set of corresponding values. But, for class initializers that do not have any adverse side effects outside of their class, they can be run safely in any order. Class initializers that do have side effects may be flagged to the developer, since this is likely undesired behavior for a class used in real-time execution.

An exemplary embodiment provides for enabling a real-time application to pre-load and verify package private classes at application startup through a general call to the service. A package is a named set of Java classes. Classes in the same package can reference data and methods that are marked as package private and which therefore can not be accessed by classes outside this package. A package private is data and methods that are only accessible from classes in the same named package. Verifying refers to a step in the process of loading a class, where the data and code of the class are deemed valid for subsequent execution in the application.

At present, known implementations can load package private classes from disk at startup, but the known implementations cannot verify these package private classes. Thus, verification is delayed until the first reference to the inner class by a class in the same package referencing the package private class. This means that real-time application programmers must either not use package private classes, which may not be an option, since real-time class libraries like Javolution use them extensively, or they must manually "warm up" their code by calling the key code paths at startup, which is error prone and complicated. To "warm up" code means to repeatedly execute an execution point to ensure that class loading, verification and just-in-time compilation have been performed for the associated code.

Thus, an exemplary embodiment provides for running a tool across the set of classes being pre-loaded by the application, and generating new classes that reference the package private classes. Because of the way these new classes are designed, the loading of these new classes will cause the referenced package private classes to be loaded and verified, instead of just being loaded. This results in verification being performed at startup instead of during execution of the real-time code.

An exemplary embodiment provides for generating classes that are structured to enable the package private classes to be loaded and verified. Package private classes use the notion of package private as a way to shield a general programmer from accessing data in an object of the class. This means that if general code tries to load a package private class directly, the load will succeed, but the class can not be instantiated through ClassLoader.newInstance( ) because the class is package private. Instantiate means to allocate and initialize an object of a given class for subsequent use. Exemplary embodiments solve this problem by performing the following steps:

1) interrogate a package Pj of a package private class Ca, deriving a unique new class name in that package (call this class Gi).
2) generate the following sequence for this class Pj.Gi:
public class Pj.Gi extends Pj.Ca
{
public Pj.Gi( )
Code:
<some code>
}
3) write this class Pj.Gi to a directory on the class path.
4) load the class Pj.Gi (but do not instantiate it) with the standard class loader.

Therefore, the class Pj.Gi can be loaded and verified because it is defined as a public class. Because the class Pj.Gi extends the package private class Pj.Ca, the loading and verification of this manufactured class will also cause the underlying package private class to be loaded and verified. Additionally, as shown in the example above, the new public class has a public constructor that accepts no parameters.

Exemplary embodiments may be used in two ways. The first way would be to generate the new classes into a jar file as part of a deployment step, then to pre-load the new jar file when running the application. This has the advantage of not requiring a writable class path at runtime, which may cause security concerns in some environments. The second approach is to issue all the steps at startup of the application, writing the classes to a well-known directory, then loading those classes from that directory. This approach has the advantage of requiring fewer steps in the deployment process at the expense of requiring a writable class path.

Turning back to the figures, FIG. 3 is a block diagram of components for executing an application written in a dynamic language in accordance with an exemplary embodiment. Application 302 is implemented on a data processing system, such as data processing system 200 in FIG. 2. Application 302 and class analysis engine 304 may be implemented on the same data processing system or on separate data processing systems.

Application 302 sends class file 306 to class analysis engine 304. Class file 306 is a list of all classes that are available to be used by application 302. Class analysis engine 304 analyses class file 306 and determines conservative class file 308, which class analysis engine 304 returns to application 302. Conservative class file 308 is "conservative" in that the list of classes contained in the file is larger than necessary and therefore conservative. That is, not every class contained within the file may actually be targeted by the application, but the list of classes contained in the file will be a superset of the actual targets. Conservative class file 308 comprises a list of classes that are "root" classes and the execution points of application 302. Conservative class file 308 is parsed by an exemplary embodiment in order to execute an application written in a dynamic language, as further described in FIG. 4.

FIG. 4 is a flowchart illustrating the operation of executing an application written in a dynamic language in accordance with an exemplary embodiment. The operation of FIG. 4 may be implemented by a class analysis engine, such as class analysis engine 304 in FIG. 3. The operation begins when a list of methods and classes, such as class file 306 in FIG. 3, is received (step 402). The operation initializes the methods and unloaded classes contained in the list of classes (step 404). Initialize means to provide initial values to a list of variables. Next, the operation simulates loading all classes on the list of classes and removes the classes from the list of classes (step 406). This simulated class loading is done in a batch fashion. Executing a series of non-interactive jobs simultaneously is batch processing. Each jar file is loaded once, reading all the classes on the class list from the jar file in one pass, reducing the I/O required for the simulated class loading. The operation scans the methods on the method list (step 408). This scanning process will find new methods and new classes. The operation determines if any new methods or classes have been found (step 410). If the operation determines that new methods or classes have been found (a yes output to step 410), the operation adds the new methods to the method list and the new classes to the class list (step 412). Then repeat step 408.

If the operation determines that no new methods or classes have been found (a no output to step 410), for all methods in classes that are already found, the operation scans their byte code (step 414). This scanning will reveal virtual methods and interfaces possibly accessed by the application. A virtual method is a method that overrides the general method definition for an object. For example, the drive( ) method of a Porsche object is the virtual method of the more general drive( ) method of a Car object. An interface is a set of methods that must be implemented by a class in order for the class to claim it has implemented the interface. The operation determines if the class is a package private class (step 430). If the operation determines that the class is a package private class (a yes output to step 430), the operation generates a new public class for the package private class (step 432) and proceeds to step 416. If the operation determines that the class is not a package private class (a no output to step 430), the operation determines if any static method byte codes have been identified (step 416). A static method is a method associated with a class. Therefore a static method is not a virtual method. Byte code is the portable set of instructions that define a component of a dynamic language. In the present exemplary embodiment, the byte code defines a component in a Java application. If the operation determines that static method byte codes have been identified (a yes output to step 416), the operation adds these static method byte codes to the method and class lists respectively (step 418) and repeats step 408.

If the operation determines that no new static method byte codes have been identified (a no output to step 416), the operation determines if any virtual methods or interfaces have been identified (step 420). If the operation determines that no new virtual methods or interfaces have been identified (a no output to step 420), the list, referred to as a conservative class list, is recorded (step 428) and the operation ends. While the present exemplary embodiment is described in terms of saving the conservative class list once no new execution points or classes are identified, it should be noted that in various implementations, the list may be saved each time the list is modified or the list may be saved periodically, based on a selected time frame. Furthermore, in other exemplary embodiments the conservative class list may be saved according to any combination of the above described methods or similar methods.

If the operation determines that new virtual methods or interfaces have been identified (a yes output to step 420), the operation records the virtual methods or interfaces (step 422). For all virtual methods and interfaces discovered the operation builds a class hierarchy of the currently loaded classes to provide a mapping from a method to the set of classes the method could target (step 424). A class hierarchy is a description of how the classes within a list of classes are related to one another. This list may be larger than on previous iterations since the previous inner loop may have loaded new classes that can be new targets of the virtual method dispatches. This list is conservative, not all classes within the list may be targeted, but the list will be a superset of the actual targets. For each virtual method, the operation assumes all dispatch targets to be valid and adds these methods to the method list (step 426) and returns to step 408.

There are areas where exemplary embodiments may fail. However, the exemplary embodiment can detect the causes of failure before they occur and thus alert the operator. One such case is if alternate class loaders are used. This can be detected because references to these class loaders will be discovered. Another failure can occur with reflection, where a class or method is manufactured as part of program execution. Reflection refers to the capability of an application to determine the definition of the classes in the application itself. Again, references to these methods, which are restricted to the core Java Runtime Environment (JRE), can be discovered at analysis time. Finally, calls to Java Native Interface (JNI) routines (non-Java code) can not be analyzed. Java Native Interface (JNI) routines are routines not written in Java, but in some other language, typically C. In this case, the user can provide proxy classes so that the conservative approach knows what is referenced. For the JRE core classes, these proxy classes have been created as required. JRE core classes are those classes defined in the packages java.lang, java.io, java.net, and java.util. Again, unknown JNI method calls can be detected and reported.

FIG. 5 is flowchart illustrating the operation of preloading and verifying package private classes in accordance with an exemplary embodiment. The operation of FIG. 5 may be implemented by a class analysis engine, such as class analysis engine 304 in FIG. 3. FIG. 5 is a more detailed illustration of step 432 in FIG. 4, when the class in question is a package private class. The operation begins by interrogating the package of the package private class to derive a unique new class name in that package (step 502). Next, the operation generates the appropriate public class sequence for the package private class (step 504). The operation writes the new public class to a directory on the class list (step 506) and the operation ends.

In one exemplary embodiment, the operation of preloading and verifying package private classes is performed at the time analysis of the class is performed. In another exemplary embodiment, instead of preloading and verifying package private classes at step 430 in FIG. 4, the class is instead added to a list and then, once it has been determined that no new classes are left to be discovered, this list is walked and the new classes are generated and added to the conservative class list.

Thus, exemplary embodiments provide for executing an application written in a dynamic language. In an exemplary embodiment, an application written in a dynamic language is scanned, starting at an execution point of the application. The scanning reveals other execution points and applications that may be reached by the application. The scanning is repeated until a list of all reachable applications and execution points is obtained.

The invention can take the form of an entirely software embodiment or an embodiment containing both hardware and software elements. In a preferred embodiment, the invention is implemented in software, which includes but is not limited to firmware, resident software, microcode, etc.

Furthermore, the invention can take the form of a computer program product accessible from a computer-usable or computer-readable medium providing program code for use by or in connection with a computer or any instruction execution system. For the purposes of this description, a computer-usable or computer readable medium can be any tangible apparatus that can contain, store, communicate, propagate, or transport the program for use by or in connection with the instruction execution system, apparatus, or device.

The medium can be an electronic, magnetic, optical, electromagnetic, infrared, or semiconductor system (or apparatus or device) or a propagation medium. Examples of a computer-readable medium include a semiconductor or solid state memory, magnetic tape, a removable computer diskette, a random access memory (RAM), a read-only memory (ROM), a rigid magnetic disk and an optical disk. Current examples of optical disks include compact disk-read only memory (CD-ROM), compact disk-read/write (CD-R/W) and DVD.

A data processing system suitable for storing and/or executing program code will include at least one processor coupled directly or indirectly to memory elements through a system bus. The memory elements can include local memory employed during actual execution of the program code, bulk storage, and cache memories which provide temporary storage of at least some program code in order to reduce the number of times code must be retrieved from bulk storage during execution.

Input/output or I/O devices (including but not limited to keyboards, displays, pointing devices, etc.) can be coupled to the system either directly or through intervening I/O controllers.

Network adapters may also be coupled to the system to enable the data processing system to become coupled to other data processing systems or remote printers or storage devices through intervening private or public networks. Modems, cable modem and Ethernet cards are just a few of the currently available types of network adapters.

The description of the present invention has been presented for purposes of illustration and description, and is not intended to be exhaustive or limited to the invention in the form disclosed. Many modifications and variations will be apparent to those of ordinary skill in the art. The embodiment was chosen and described in order to best explain the principles of the invention, the practical application, and to enable others of ordinary skill in the art to understand the invention for various embodiments with various modifications as are suited to the particular use contemplated.

What is claimed is:

1. A computer-implemented method, comprising:
   receiving, from an application, a jar file having a class file including a list of methods and classes, the list of methods and classes including a method list and a class list;
   loading, in a batch, all the classes in the list of methods and classes;

performing first loop operations of a first loop until no new methods and classes are found in the list of methods and classes, the first loop operations including:
  scanning each method within the method list to identify new method(s) and/or class(es) therefrom, and
  adding the identified new method(s) and/or class(es) to the list of methods and classes;
performing second loop operations of a second loop until no new static method byte codes are identified, the second loop operations including:
  adding identified new static method byte codes to the list of methods and classes,
  executing the first loop, and
  scanning byte code of all the methods in the method list to identify any virtual method(s) and/or interface(s) accessed by the application;
performing third loop operations of a third loop until no new virtual method(s) and/or interface(s) are identified, the third loop operations including:
  building, for each of the new identified virtual method(s) and/or interface(s), a class hierarchy describing how the classes within the list of classes are related to one another,
  adding, for each of the new identified virtual method(s), all dispatch targets to the method list, and
  executing the second loop;
recording, as a conservative class list, the modified class list; and
forwarding, to the application, the conservative class list.

2. The method of claim 1, wherein the second loop operations include:
identifying a class as a package private class; and
generating, based upon the package private class being identified, a new public class for the package private class.

3. The method of claim 2, wherein the generating includes
interrogating a package of the package private class to derive a unique new class name in the package;
creating a public class sequence for the package private class;
writing the new public class to a directory in the class list.

4. The method of claim 3, wherein
the new public class is not instantiated.

5. The method of claim 3, wherein
the new public class has a public constructor that accepts no parameters.

6. The method of claim 1, wherein
the conservative class list is recorded each time the class list is modified.

7. A computer hardware system, comprising:
a hardware processor; and
a computer hardware memory having stored therein instructions executable by the hardware processor, the instructions including:
  receiving, from an application, a jar file having a class file including a list of methods and classes, the list of methods and classes including a method list and a class list;
  loading, in a batch, all the classes in the list of methods and classes;
  performing first loop operations of a first loop until no new methods and classes are found in the list of methods and classes, the first loop operations including:
    scanning each method within the method list to identify new method(s) and/or class(es) therefrom, and
    adding the identified new method(s) and/or class(es) to the list of methods and classes;
  performing second loop operations of a second loop until no new static method byte codes are identified, the second loop operations including:
    adding identified new static method byte codes to the list of methods and classes,
    executing the first loop, and
    scanning byte code of all the methods in the method list to identify any virtual method(s) and/or interface(s) accessed by the application;
  performing third loop operations of a third loop until no new virtual method(s) and/or interface(s) are identified, the third loop operations including:
    building, for each of the new identified virtual method(s) and/or interface(s), a class hierarchy describing how the classes within the list of classes are related to one another,
    adding, for each of the new identified virtual method(s), all dispatch targets to the method list, and
    executing the second loop;
  recording, as a conservative class list, the modified class list; and
  forwarding, to the application, the conservative class list.

8. The system of claim 7, wherein the second loop operations include:
identifying a class as a package private class; and
generating, based upon the package private class being identified, a new public class for the package private class.

9. The system of claim 8, wherein the generating includes
interrogating a package of the package private class to derive a unique new class name in the package;
creating a public class sequence for the package private class;
writing the new public class to a directory in the class list.

10. The system of claim 9, wherein
the new public class is not instantiated.

11. The system of claim 9, wherein
the new public class has a public constructor that accepts no parameters.

12. The system of claim 7, wherein
the conservative class list is recorded each time the class list is modified.

13. A computer program product, comprising,
a hardware storage device having stored therein computer instructions,
the computer instructions, when executed by a computer hardware system, causes the computer hardware system to perform:
  receiving, from an application, a jar file having a class file including a list of methods and classes, the list of methods and classes including a method list and a class list;
  loading, in a batch, all the classes in the list of methods and classes;
  performing first loop operations of a first loop until no new methods and classes are found in the list of methods and classes, the first loop operations including:
    scanning each method within the method list to identify new method(s) and/or class(es) therefrom, and adding the identified new method(s) and/or class(es) to the list of methods and classes;
performing second loop operations of a second loop until no new static method byte codes are identified, the second loop operations including:
  adding identified new static method byte codes to the list of methods and classes,
  executing the first loop, and
  scanning byte code of all the methods in the method list to identify any virtual method(s) and/or interface(s) accessed by the application;
performing third loop operations of a third loop until no new virtual method(s) and/or interface(s) are identified, the third loop operations including:
  building, for each of the new identified virtual method(s) and/or interface(s), a class hierarchy describing how the classes within the list of classes are related to one another,
  adding, for each of the new identified virtual method(s), all dispatch targets to the method list, and
  executing the second loop;
recording, as a conservative class list, the modified class list; and
forwarding, to the application, the conservative class list.

14. The computer program product of claim 13, wherein the second loop operations include:
identifying a class as a package private class; and
generating, based upon the package private class being identified, a new public class for the package private class.

15. The computer program product of claim 14, wherein the generating includes
interrogating a package of the package private class to derive a unique new class name in the package;
creating a public class sequence for the package private class;
writing the new public class to a directory in the class list.

16. The computer program product of claim 15, wherein the new public class is not instantiated.

17. The computer program product of claim 15, wherein the new public class has a public constructor that accepts no parameters.

18. The computer program product of claim 13, wherein the conservative class list is recorded each time the class list is modified.

* * * * *